T. A. SULLIVAN & H. J. VON BECK.
BARREL HEADING APPARATUS.
APPLICATION FILED JAN. 2, 1917.

1,228,076.

Patented May 29, 1917.
3 SHEETS—SHEET 1.

WITNESSES:
Dorothy Miatt

INVENTORS:
Thomas A. Sullivan,
Henry J. Von Beck
By their ATTORNEY.
Geo. Wm Miatt T. A. SULLIVAN & H. J. VON BECK.
BARREL HEADING APPARATUS.
APPLICATION FILED JAN. 2, 1917.

1,228,076.

Patented May 29, 1917.
3 SHEETS—SHEET 2.

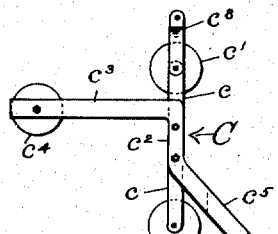
Fig. 6.
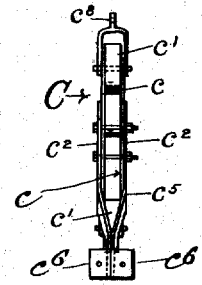
Fig. 7.
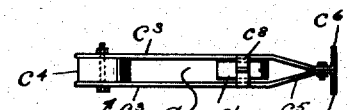
Fig. 8.
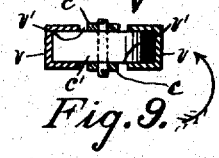
Fig. 9.
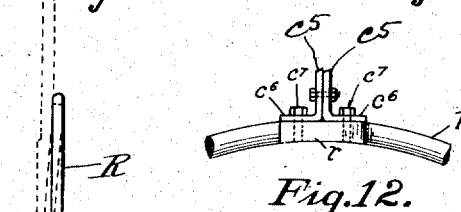
Fig. 12.
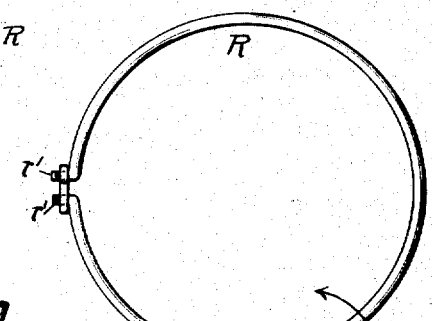
Fig. 10.
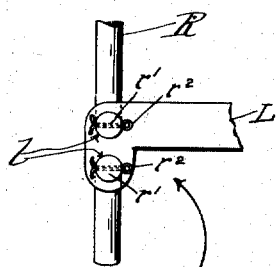
Fig. 11.
Fig. 13.
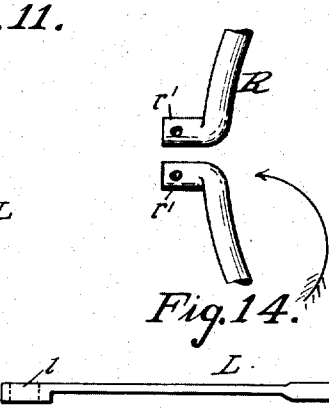
Fig. 14.
Fig. 15.
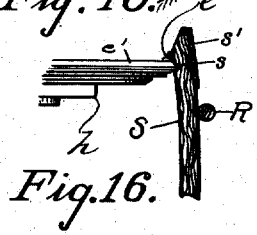
Fig. 16.

UNITED STATES PATENT OFFICE.

THOMAS A. SULLIVAN, OF BROOKLYN, NEW YORK, AND HENRY J. VON BECK, OF BOSTON, MASSACHUSETTS, ASSIGNORS TO BROOKLYN COOPERAGE COMPANY, OF NEW YORK, N. Y., A CORPORATION OF NEW YORK.

BARREL-HEADING APPARATUS.

1,228,076.  Specification of Letters Patent.  Patented May 29, 1917.

Application filed January 2, 1917. Serial No. 140,199.

*To all whom it may concern:*

Be it known that we, THOMAS A. SULLIVAN, a citizen of the United States, and a resident of the borough of Brooklyn, county of Kings, city and State of New York, and HENRY J. VON BECK, a citizen of the United States, and a resident of the city of Boston, county of Suffolk, and State of Massachusetts, have invented certain new and useful Improvements in Barrel-Heading Apparatus, of which the following is a specification.

Our improvements relate to mechanism for applying and securing the ends or "heads" of barrels to and by means of the stave chines, the object being to facilitate and expedite the operation in such manner as to effect a material saving in time and labor, and hence to attain greater efficiency and economy in manufacture.

Our invention consists in the specific construction and arrangement of parts described and claimed, a distinctive feature being the use, in conjunction with an adjustable table or rest for the head boards, of a counterpoised stave compression clutch ring, by the use of which the operator is enabled to manipulate the parts to greater advantage than heretofore, all as hereinafter fully set forth.

In the accompanying drawings,

Fig. 6, is a side elevation of the stave-clamping ring carriage;

Fig. 7, is a front view thereof;

Fig. 8, is a top view thereof;

Fig. 9, is a view on an enlarged scale, showing the carriage runway in cross section;

Fig. 10, is a top view of the stave-clamping ring;

Fig. 11, is a side elevation thereof;

Fig. 12, is a detail on a larger scale showing the attachment of the stave-clamping ring to its bracket on the supporting carriage;

Fig. 13, is a detail on a larger scale of the ends of the stave-clamping ring and the engaging end of its manipulatory lever, connected;

Fig. 14, is a detail view upon a like scale of the ends of the stave-clamping ring;

Fig. 15, is a detail view of the inner fulcrum end of the manipulatory lever;

Fig. 16, is a sectional detail illustrating the function of the stave-clamping ring in compressing and holding the ends of the staves against the head until secured by the application of the chine hoop.

V, is a vertical runway or track of suitable height consisting preferably of two channel irons $v$, $v$, with their grooved faces opposed to each other and spaced apart to form central vertical slots $v'$, $v'$, to accommodate the side members $c$, $c$, of the carriage C, which supports the stave-clamping ring R. Mounted on and between these side members $c$, $c$, of the carriage C, are rollers $c'$, $c'$, which fit in the opposed runway grooves in the said vertical channel irons $v$, $v$, and thereby provide for the easy travel of the said carriage C. Secured to the side members $c$, $c$, of the carriage C, are the bracket pieces $c^2$, $c^2$, formed with rearwardly projecting arms $c^3$, $c^3$, between which is secured a counterpoise $c^4$, and with forwardly projecting convergent arms $c^5$, $c^5$, the ends of which are out-turned in opposite directions to form flanges $c^6$, $c^6$, to which the stave-clamping ring R, is rigidly secured, as by means of screw bolts $c^7$, $c^7$, shown more particularly in Fig. 12,—the ring R, which is preferably of the nature of a metallic hoop circular in cross section, being flattened at this part, $r$, to contact more effectually with the bracket flanges $c^6$, $c^6$. The counterpoise $c^4$, is of a weight approximating that of the stave-clamping ring R, so that the carriage will be evenly balanced and run freely in the ways $v$, $v$.

Figure 1:
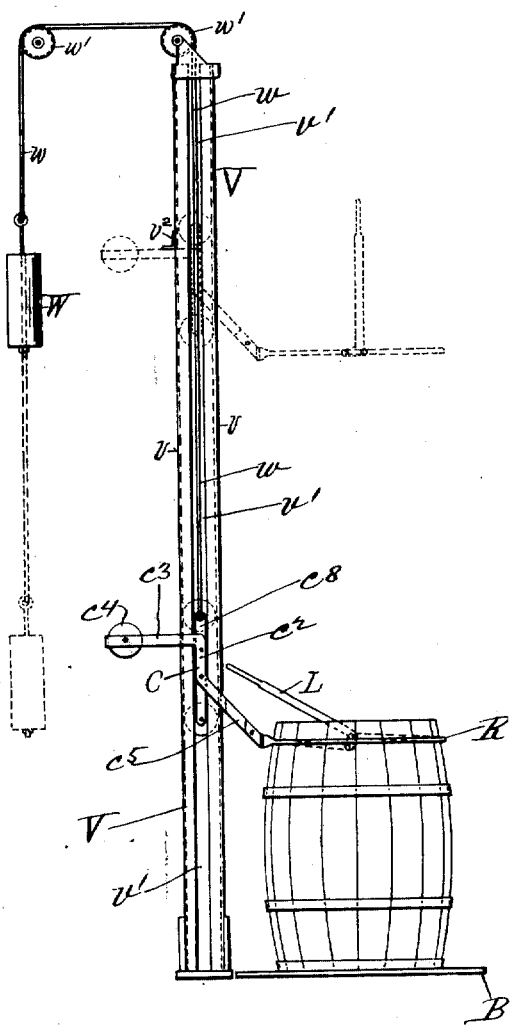
Figure 1, is a side elevation of apparatus embodying the essential features of our invention, the stave clamping ring being shown in solid lines as applied to a barrel, and in dotted lines as in elevated position.
Figure 2:
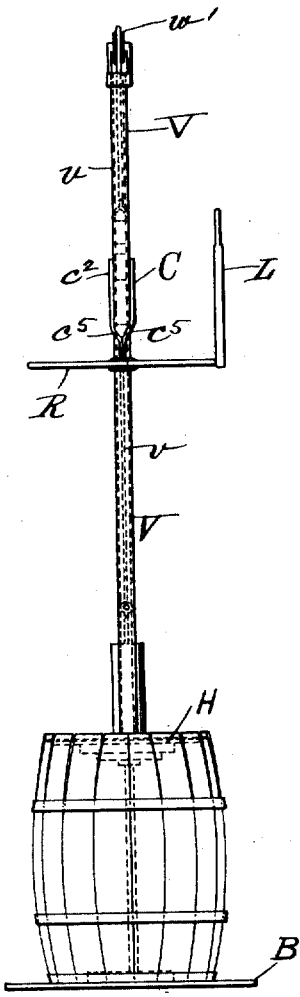
Fig. 2, is an elevation taken at right angles to Fig. 1, showing in solid lines the stave-clamping ring in elevated position, and illustrating the position of the head board rest in dotted lines.
Figure 3:
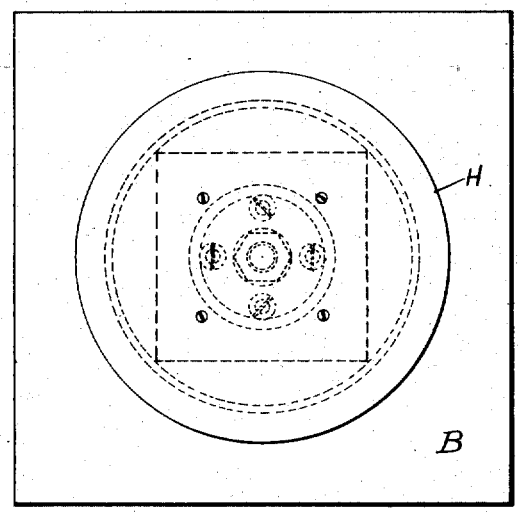
Fig. 3, is a plan of the head rest and its base, on a larger scale.
Figures 4, 5:
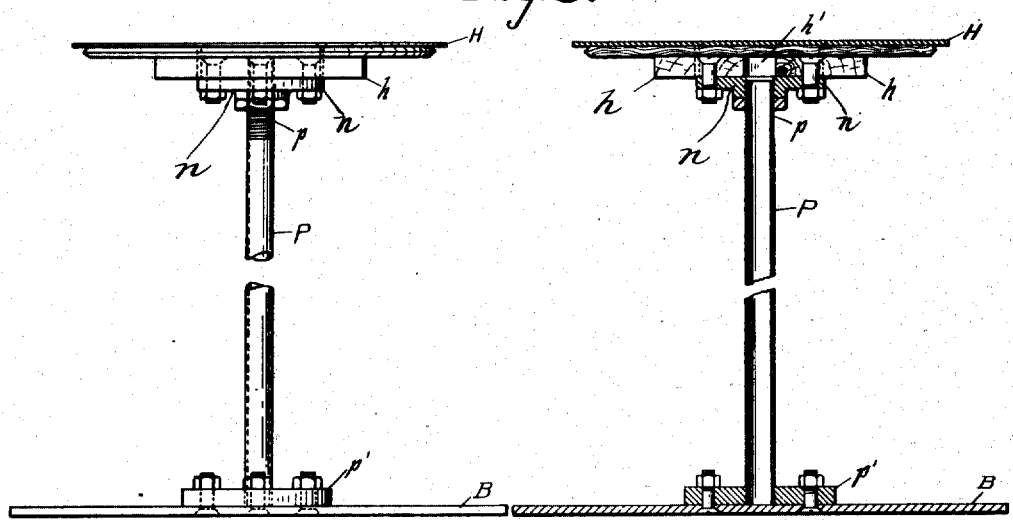
Fig. 4, is an elevation thereof, with the standard broken away centrally.
Fig. 5, is a central vertical sectional elevation of the same.

The carriage as a whole is itself counterpoised by a weight W, attached to a flexible connection $w$, which passes over idler pulleys $w'$, $w'$, and is secured to a stirrup $c^8$, pivotally connected with the side members $c$, $c$, of the carriage C. Thus the stave-clamping ring R, may be freely and conveniently raised or lowered with but little exertion on the part of the operator. A stop $v^2$, (Fig. 1) may be provided on the runway V, to gage the higher position of the carriage C, so that the stave-clamping ring R, will always be conveniently available and within reach of the operator.

Positioned in front of the vertical track V, and immediately under the stave-clamping ring R, is a base plate or barrel platform B, on which is mounted a barrel head rest H, concentrically related to the stave-clamping ring R,—the standard $h$, on which said head rest H, is supported being in vertical axial alinement with the center of said ring R. This concentric arrangement of stave-clamping ring, R, head rest H, and its support $h$, is an essential and important feature of our construction and arrangement of parts on which depends the successful operation of the apparatus, since the parallelism of alinement of carriage travel and central support for the head rest H, must be perfect in order to attain the best results in speed and convenience of manipulation during the operation of securing the edges of a head in the croze of the barrel end.

The stave-clamping hoop or ring R, is essentially annular in shape except that its ends $r'$, $r'$, are out-turned to form fulcrums for engagement with the bearing holes $l$, $l$, formed for their reception in the inner extremity of the manipulatory lever L, which is held in place on the ring R, by cotter pins $r^2$, $r^2$, inserted in holes formed for them in said end fulcrum $r'$, $r'$, as shown more particularly in Fig. 13. Either of the out-turned ends $r'$, $r'$, of the stave-clamping ring is adapted to act as a fulcrum for the lever L, which latter may be moved in either direction with like result in that said ends will be deflected more or less from alinement with the medial portion of the ring, thereby lessening its diameter and causing it to contract around the barrel staves if applied thereto, so as to fit the croze $s$, of the staves S, to the chamfered edges $e$, of the end boards $e'$, as indicated in Fig. 16, in which position and relationship the parts are then secured by the application of the chine hoop $s'$, in the usual manner.

The table or rest H, for the boards $e'$, of the "head" or barrel end, is preferably a circular plate of metal of slightly less diameter than the diameter of the "head" to be applied to the chine of the barrel; and it is adjustable in height to adapt it to different sizes of barrels. As shown in the accompanying drawings the rest H, is attached to a block $h$, rigidly secured in turn to a flanged nut $n$, which engages the threaded upper end $p$, of the standard P, having a foot flange $p'$, which is rigidly secured to the base plate B. The block $h$, is formed with a central recess $h'$, to accommodate the upper end of the standard P, when necessary in adjusting the rest H, to barrels of lesser height. As before intimated the vertical axis of the standard P, is coincident with the center of the stave-contracting ring R; and the base plate B, is of sufficient thickness and area to afford ample support for the sizes of barrels to be headed by the apparatus.

The "head" or end applied by this apparatus is really the bottom end or head of the barrel, the parts of which are assembled as heretofore without the chine hoop $s'$, at this end, so that these ends of the staves are spread apart slightly, it being the function of the clamping ring R, to compress them around the head boards $e'$, and hold them there until secured by the chine hoop $s'$.

Heretofore the clamping ring R, has been lifted into and out of operative position over the end of the barrel by hand exclusively, and as it is comparatively heavy, and unwieldy under such conditions, much time, labor and inconvenience is involved in the old method of securing the barrel end or bottom $e'$, whereas by our new construction and arrangement of parts manipulation is facilitated to such an extent that a single operator can "head" many more barrels in a given period with less exertion and fatigue, thereby cheapening the production.

What we claim as our invention and desire to secure by Letters Patent is,

1. Barrel heading apparatus of the character designated, comprising a support for the barrel, a head rest carried by said support, a stave clamping ring in vertical alinement therewith, a vertical runway disposed entirely upon one side of and independent of said support, a carriage mounted to travel on said runway and carrying said clamping ring, and a manipulating lever mounted on said ring.

2. Barrel heading apparatus of the character designated, comprising a support for the barrel, a head rest carried by said support, a stave clamping ring in vertical alinement therewith, a vertical runway disposed entirely upon one side of and independent of said support, a carriage mounted to travel on said runway and carrying said clamping ring, a manipulating lever mounted on said ring, a stirrup pivotally connected with said carriage and a flexible ligament connected with said stirrup and movable in said runway and counterbalanced.

3. Barrel heading apparatus of the character designated, comprising a vertically adjustable support for the end boards, a stave clamping ring in vertical alinement therewith, a runway to one side of said support, a carriage guided therein, said carriage having rearwardly projecting arms carrying a counterpoise and forwardly projecting convergent arms connected with said stave clamping ring.

4. Barrel heading apparatus of the character designated, comprising a vertically adjustable support for the end boards, a stave clamping ring in vertical alinement therewith, a runway, a carriage guided therein, said carriage having rearwardly projecting arms carrying a counterpoise and forwardly projecting convergent arms connected with said stave clamping ring, a stirrup pivotally connected with said carriage and guided in said runway, and a counterpoised flexible ligament connected with said stirrup.

5. In apparatus of the character designated, the combination of a support for the head boards, and a stave-clamping ring in vertical alinement therewith, a carriage on which said ring is mounted, said carriage being formed with a rear extension weighted to counterbalance the weight of said stave clamping ring, vertical ways for said carriage, and another counterweight attached to said carriage by means of a flexible connection idler-roller supported.

6. In apparatus of the character designated, the combination of an adjustable support for the head boards comprising a table mounted upon a flanged nut engaging a thread formed for it on the upper extremity of a standard mounted on a base plate which forms the barrel support, and a stave-clamping ring in vertical alinement with said head board support mounted upon a vertically movable carriage, a vertical runway to one side of said support and a carriage vertically guided in said runway, said carriage being mounted for pivotal movement.

7. In barrel heading apparatus of the character designated, the combination of a vertical runway, a carriage having side members guided in said runway, rollers mounted on said side members and fitting in opposed grooves in the runway, bracket pieces secured to the side members of the carriage and formed with rearwardly projecting arms and with forwardly projecting convergent arms, a counterpoise mounted in the rearwardly projecting arms, the ends of the forwardly projecting convergent arms terminating in flanges, a stave clamping ring rigidly secured to said flanges, a stirrup pivotally connected with the side members of the carriage, and a counterpoised flexible ligament connected with said stirrup for counterpoising the carriage and the clamping ring.

THOMAS A. SULLIVAN.
HENRY J. VON BECK.

Witnesses:
 DOROTHY MIATT,
 GEO. WM. MIATT.

Copies of this patent may be obtained for five cents each, by addressing the "Commissioner of Patents, Washington, D. C."